(12) United States Patent
Fukuhara et al.

(10) Patent No.: US 6,546,144 B1
(45) Date of Patent: Apr. 8, 2003

(54) IMAGE GENERATING METHOD AND APPARATUS

(75) Inventors: Takahiro Fukuhara, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/336,504

(22) Filed: Jun. 18, 1999

(30) Foreign Application Priority Data

Jun. 25, 1998 (JP) ............................................ 10-179239

(51) Int. Cl.[7] ................................................. G06K 9/36
(52) U.S. Cl. ......................... 382/240; 382/232; 382/299
(58) Field of Search ................................ 382/232, 233, 382/250, 251, 240, 284, 294, 298, 299; 345/418, 419, 522

(56) References Cited

U.S. PATENT DOCUMENTS

| | | | | |
|---|---|---|---|---|
| 5,761,343 A | * | 6/1998 | Haruma et al. | 382/236 |
| 5,943,054 A | * | 8/1999 | Hirano et al. | 345/827 |
| 6,008,812 A | * | 12/1999 | Ueda et al. | 345/418 |
| 6,041,143 A | * | 3/2000 | Chui et al. | 382/232 |
| 6,173,086 B1 | * | 1/2001 | Hara | 382/128 |
| 6,195,465 B1 | * | 2/2001 | Zandi et al. | 382/233 |
| 6,259,819 B1 | * | 7/2001 | Andrew et al. | 382/166 |

* cited by examiner

Primary Examiner—Jayanti K. Patel
Assistant Examiner—Ali Bayat
(74) Attorney, Agent, or Firm—Sonnenschein, Nath & Rosenthal

(57) ABSTRACT

An image generating method and apparatus for high-efficiency recording or displaying of a thumb-nail image or an image converted in resolution. The image display apparatus includes an image inputting unit 1 for inputting an image, an image signal pre-processing unit 2 for pre-processing the input image to generate a digitized image, a band image splitting unit 2 for pre-processing the input image to generate a digitized image, a band image splitting unit 20 for splitting the frequency spectrum of the digitized image data into one or more bands to produce band-based band images, a band image encoding unit 30 for converting the band image into encoded data, a band image decoding unit 40 for decoding the encoded data to obtain band images, and a band image synthesis unit 50 for synthesizing the band images to produce a band-synthesized image. The image display apparatus also includes an image memory 5 for storing an intermediate image obtained from the band images and a display controller 3 for displaying the band images in a controller fashion on a display unit. The image display apparatus also has a controller 4 for controlling the entire system.

28 Claims, 13 Drawing Sheets

IMAGE GENERATING METHOD AND APPARATUS

BACKGROUND OF THE INVENTION

1. Field of the Invention

This invention relates to a image generating method and apparatus. More particularly, it relates to a image generating method and apparatus for realizing efficient image transmission or storage.

2. Description of the Related Art

Among the conventional representative image generating apparatus, there is the JPEG (Joint Photographic Coding Experts Group) system standardized by ISO. It is known that if, with the use of this system, a larger number of bits are allocated, satisfactory encoded and decoded images can be furnished. However, if the number of bits for encoding is reduced beyond a certain value, block distortion proper to the discrete cosine transform (DCT) becomes outstanding to render the subjective image deterioration apparent.

In recent years, investigations into an encoding system in which an image is split into plural bands by a filter device, termed a filter bank, combined from a high-pass filter and a low-pass filter, and is encoded from one band to another. Among these encoding methods is a wavelet encoding.

This wavelet encoding is felt to be promising as a new technique which possibly takes the place of the DCT because it is free from a defect proper to the DCT that block distortion becomes apparent in case of high compression.

For example, the above-mentioned image compression system is used in an imaging device, such as an electronic still camera or a video movie. In this imaging device, the above-mentioned JPEG system or the MPEG (Moving Picture Experts Group) system is used, and DCT is resorted to as an image transformation system.

Meanwhile, in an electronic still camera or video movie, an image as photographed is converted, or worked on. In the electronic still camera or video movie, the photographed image is occasionally converted to a thumbnail image or converted in resolution for storage in a memory or display on a display device.

In the electronic still camera or video movie, a thumbnail image or a photographed image converted in resolution is frequently stored or displayed. It is therefore desirable that the thumbnail image or the image converted in resolution be stored or displayed highly efficiently.

The wavelet transform which splits the frequency spectrum of an image for image transformation, may be said to contribute to improvement of the efficiency of the encoding system. However, there lacks a product which fully exploits the features of the wavelet transform.

SUMMARY OF THE INVENTION

It is therefore an object of the present invention to provide an image generating method and apparatus whereby a thumbnail image or an image converted in resolution can be stored or displayed highly efficiently.

In one aspect, the present invention provides an image generating apparatus including image inputting means for inputting an image, image processing means for pre-processing the input image for generating a digitized image, band image splitting means for splitting the frequency spectrum of the digitized image to yield band-based band images, storage means for storing an intermediate image obtained based on the band images, and display control means for displaying the intermediate image in controlled manner on a display unit.

In the image generating device, configured as described above, an input image is pre-processed to generate a digitized image, which then is split by band image splitting means into one or more bands to generate band-based band images. An intermediate image obtained based on the band images is displayed in a controlled fashion on a display by the display control means of the image generating device.

Thus, with the present image generating apparatus, a band image can be displayed on the display unit as a thumb-nail image or as a contracted image.

In another aspect, the present invention provides an image generating apparatus including an image inputting step for inputting an image, an image processing step for pre-processing the input image for generating a digitized image, a band image splitting step for splitting the frequency spectrum of the digitized image into one or more bands to yield band-based band images, a storage step for storing an intermediate image obtained based on the band images and a display control step for displaying the intermediate image in a controlled fashion.

In the image generating method, configured as described above, an input image is pre-processed to generate a digitized image, which then is split by the band image splitting step into one or more bands to generate band-based band images. An intermediate image obtained based on the band images is displayed in a controlled fashion on a display by the display control step of the image generating method.

Thus, with the present image generating method, a band image can be displayed as a thumb-nail image or as a contracted image.

In still another aspect, the present invention provides an image generating apparatus including decoding means for decoding encoded data comprised of an encoder version of band images obtained on band splitting, band image synthesizing means for synthesizing decoded band images to produce a band-synthesized image, storage means for storing an intermediate image obtained based on the decoded band images, and display control means for displaying the intermediate image in controlled manner on a display unit.

In the image generating apparatus, configured as described above, the encoded data, which is an encoded version of the band images obtained on band splitting, is decoded by decoding means. The decoded band images are synthesized by band image synthesizing means of the image generating apparatus to generate a band-synthesized image. The intermediate image, obtained based on the band images, is displayed in a controlled fashion on the display unit.

Thus, with the present image generating apparatus, a band image can be displayed on the display unit as a thumb-nail image or as a contracted image.

In yet another aspect, the present invention provides an image generating method including a decoding step for decoding encoded data comprised of an encoded version of band images obtained on band splitting, a band image synthesizing step for synthesizing decoded band images to produce a band-synthesized image, a storage step for storing an intermediate image obtained based on the decoded band images, and a display control step for displaying the intermediate image in a controlled manner.

In the image generating method, configured as described above, the encoded data, which is an encoded version of the band images obtained on band splitting, is decoded by the decoding step. The decoded band images are synthesized by the band image synthesizing step of the image generating method to generate a band-synthesized image. The intermediate image, obtained based on the band images, is then displayed in a controlled fashion.

Thus, with the present image generating method, a band image can be displayed on the display unit as a thumb-nail image or as a contracted image.

DESCRIPTION OF THE PREFERRED EMBODIMENTS

Figure 1:
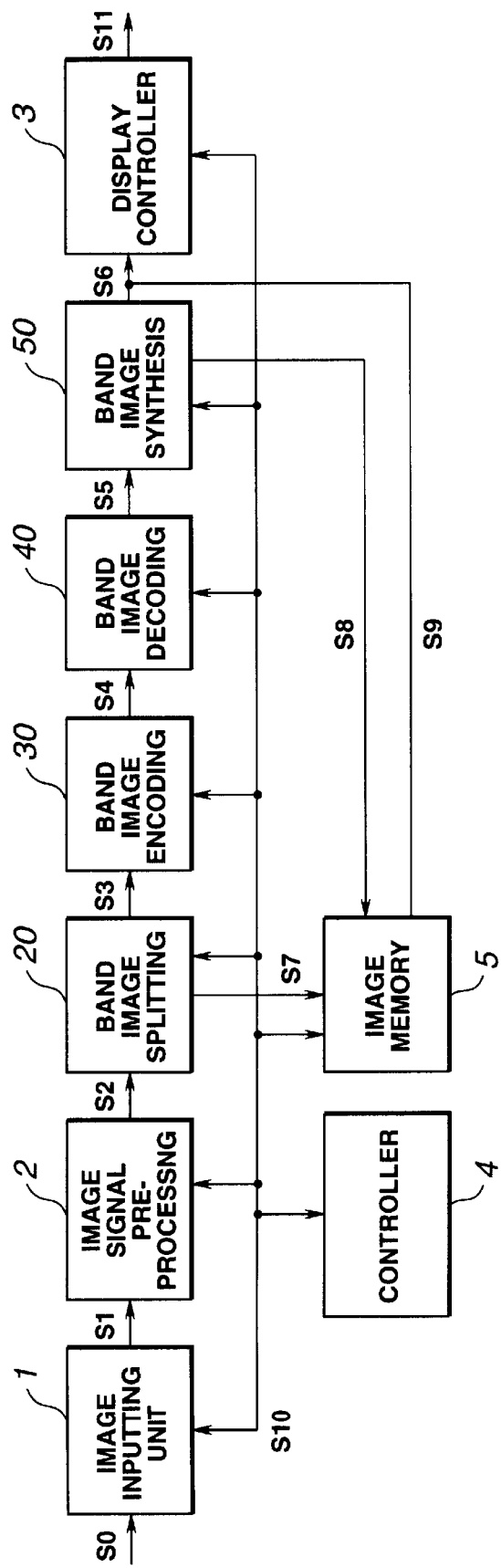
FIG. 1 is a block circuit diagram showing a structure of an image display apparatus as a first embodiment of the present invention.

Referring to the drawings, preferred embodiments of the image generating method and apparatus according to the present invention will be explained in detail.

In a first embodiment of the present invention, the image generating method and apparatus according to the present invention is applied to an image displaying apparatus having the function of displaying an input image on an image display device.

Referring to FIG. 1, the image display device as the first embodiment includes an image inputting unit 1, as image inputting means for inputting an image, and an image signal pre-processing unit 2 for pre-processing an input image to generate a digitized image. The image display device also includes a band image splitting unit 20, as band image splitting means for splitting the frequency spectrum of digitized image data into one or more bands to produce band-based band images, and a band image encoding unit 30 as encoding means for converting a band image into encoded data. The image display device also includes a band image decoding unit 40 as decoding means for producing decoded band images from the encoded data, and a band image synthesis unit 50 as band image synthesizing means for synthesizing the band images to produce a synthesized band image. Finally, the image display device includes an image memory 5 as storage means for storing an intermediate image derived from the band images and a display controller 3 as display control means for displaying the band image in a controller manner on a display. The image display device in its entirety is controller by a controller 4.

The image display device retrieves an image as an input signal S0. Th input signal S0 is first inputted to the image inputting unit 1.

The image inputting unit 1 converts the input signal S0 into picture data. The image inputting unit 1 is constituted by, for example, an imaging device, such as a CCD, and converts an optical signal into electrical signals. The image data S1, generated by the image inputting unit 1, is inputted to the image signal pre-processing unit 2.

The image data S1 is pre-processed in a pre-set fashion by the image signal pre-processing unit 2. The image signal pre-processing unit 2 includes, as an example, a gain controller for correcting the gain of the image data S1, and an A/D converter for converting analog signals into digital signals. This image signal pre-processing unit 2 pre-processes the image data S1 to output a digitized image signal S2.

The image signal pre-processing unit 2 is able not only to execute the above processing but also to perform such functions as adjustment of the amplitude of the image signals or noise removal.

The image signal S2 from the image signal pre-processing unit 2 is inputted to the band image splitting unit 20.

The band image splitting unit 20 band-splits the image signal S2 to produce plural band images S3. These band images S3 are generated by the band image splitting unit 20 in accordance with, for example, wavelet transform as the band-splitting system. The generated band image S3 is inputted to the band image encoding unit 30.

The band image splitting unit 20 is responsive to a command signal S10 from the controller 4 to output to an image memory 5 at least one band image S7, split to a pre-set level, from among the plural band images S3.

The image memory 5 is memory means configured for storing and holding the band image S7 outputted by the band image splitting unit 20. Of the band-split images, obtained at the band image splitting unit 20, the band image S7 of the resolution or the level specified by the control signal from the controller 4 is sent from the band image splitting unit 20 and stored or held in the image memory 5. The band image thus stored or held in the image memory 5 is displayed as an intermediate image on a display device by the display controller 3.

The band image encoding unit 30 encodes the band image S3 to generate an encoded bitstream S4, as encoded data, which is outputted. The output encoded bitstream is inputted to the band image decoding unit 40.

The band image decoding unit 40 decodes the encoded bitstream S4 to generate plural expanded band images S5. The decoded band images S5 are inputted to the band image synthesis unit 50. It is also possible for the band image decoding unit 40 to decode the encoded bitstream transiently stored in the image memory 5 to generate a band images S5.

The band image synthesis unit 50 band-synthesizes the restored band image S5 to generate a band synthesized image S6. This band image synthesis unit 50 band-synthesizes the band image by inverse wavelet transform to generate the band-synthesized image. That is, the band image synthesis unit 50 employs the band synthesis system for matching to the band image splitting unit 20.

A band-synthesized image S6, obtained on synthesis up to an intermediate stage by the band image synthesis unit 50, is inputted to the display controller 3. The band-synthesized picture, generated by the band image synthesis unit 50, is stored and held in the image memory 5. The band-synthesized image, stored in the image memory 5, is subsequently displayed as an intermediate image on a display by the display controller 3.

The display controller 3 executes control for displaying the image on the display unit to produce an output image S11.

The controller 4 operates as means for controlling the above-mentioned various components, and controls the various components by control signals.

The image display device is made up of the above-defined components. The band image splitting unit 20, band image encoding unit 30, band image decoding unit 40 and the band image synthesis unit 50 are hereinafter explained.

Figure 2:
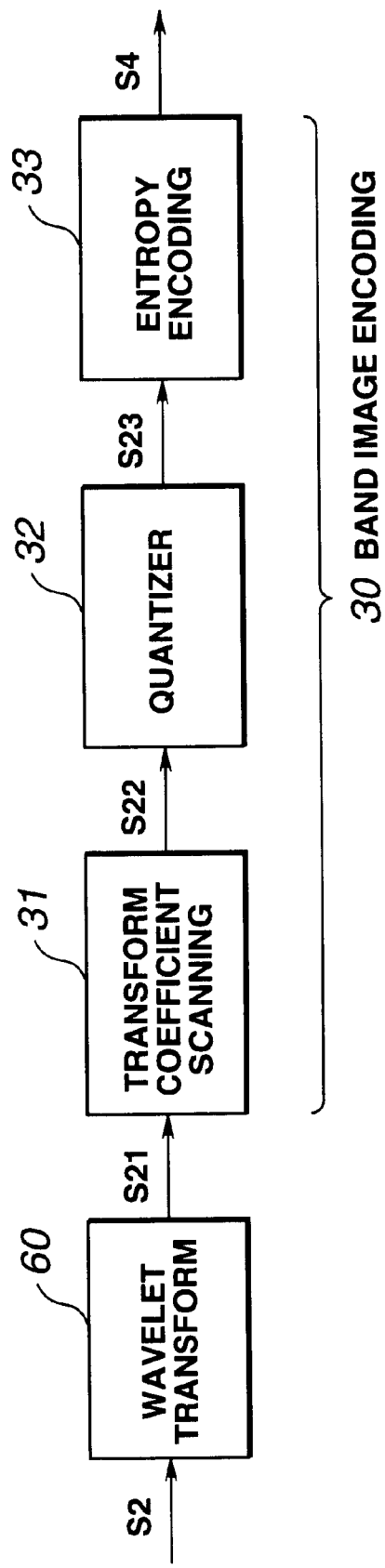
FIG. 2 is a block circuit diagram showing a specified structure of a band image splitting unit and a band image encoding unit of the image display apparatus shown in FIG. 1.

Referring to FIG. 2, the band image splitting unit 20 and the band image encoding unit 30 are configured for executing the wavelet transform and encoding, as shown in FIG. 2, and includes a wavelet transform unit 60, a transform coefficient scanning unit 31, a quantizer 32 and an entropy encoding unit 33. The wavelet transform unit 60 belongs to the band image splitting unit 20.

The wavelet transform 60 splits the image into plural images for separate band components to produce respective band images. This outputs the wavelet transform coefficients S21 of the respective split bands to the transform coefficient scanning unit 31.

Figure 3:
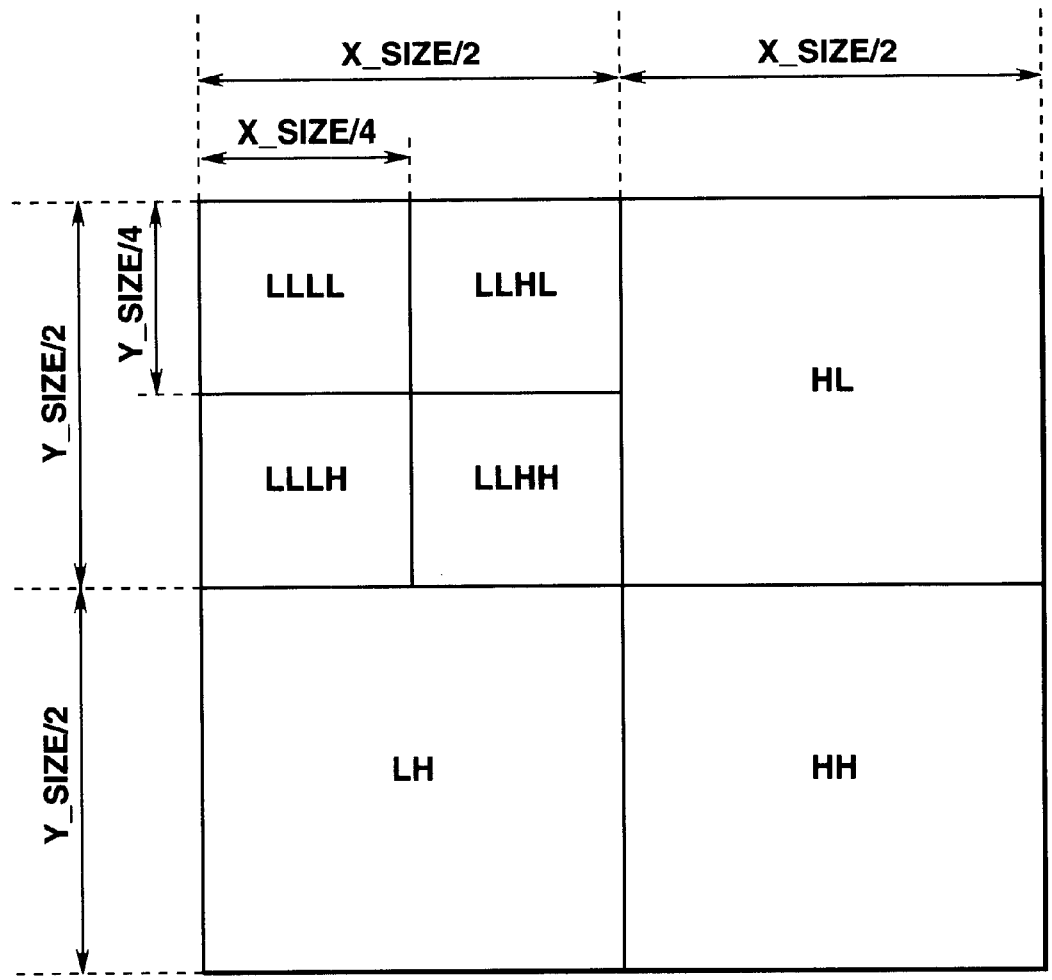
FIG. 3 illustrates a band image generated by of the image display apparatus.

The wavelet transform unit 60 splits the image, as shown in FIG. 3, showing seven band components generated. This will be explained subsequently in detail.

The wavelet transform coefficients, outputted by this wavelet transform unit 60, are inputted to the transform coefficient scanning unit 31.

The transform coefficient scanning unit 31 scans and orders the wavelet transform coefficients S21 for re-arraying. The re-arrayed wavelet transform coefficients S22 are inputted to the quantizer 32.

The quantizer 32 quantizes the wavelet transform coefficient S22 to generate quantization coefficients S23, which are inputted to the entropy encoding unit 33.

The entropy encoding unit 33 executes information source encoding, such as Huffmann coding or arithmetic coding, based on the quantization coefficients S23, to generate an encoded bitstream S4. The generated encoded bitstream S4 is inputted to the band image decoding unit 40.

Figure 4:
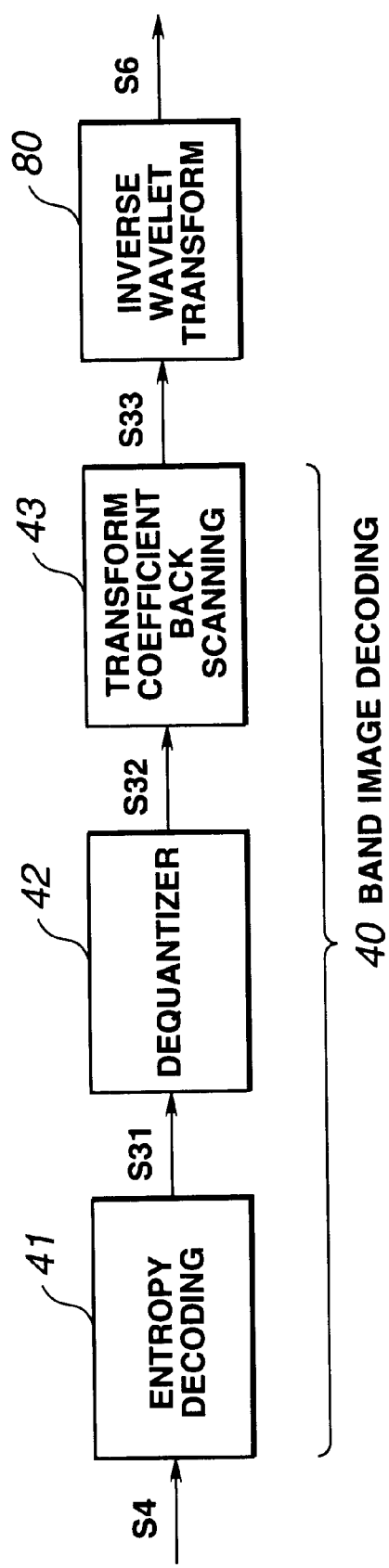
FIG. 4 is a block circuit diagram showing a specified structure of a band image decoding unit and a band image synthesis unit of the image display apparatus.

The structures of the band image decoding unit 40 and the band image synthesis unit 50 are hereinafter explained. Referring to FIG. 4, the band image decoding unit 40 and the band image synthesis unit 50 are constituted by an entropy decoding unit 41, a dequantizer 42, a transform coefficient back-scanning unit 43 and an inverse wavelet transform unit 80. The inverse wavelet transform unit 80 belongs to the band image synthesis unit 50.

The processing executed by the entropy decoding unit 41, dequantizer 42, transform coefficient back-scanning unit 43 and by the inverse wavelet transform unit 80 is the reverse of the processing executed by the entropy encoding unit 33, quantizer 32, transform coefficient scanning unit 31 and by the wavelet transform unit 60, respectively.

That is, the entropy decoding unit 41 generates decoded quantization coefficients S31 from the input encoded bitrate S4. The dequantizer 42 generates wavelet transform coefficients following the inverse transformation S32 from the quantization coefficients S31. The transform coefficient back-scanning unit 43 outputs the wavelet transform coefficients following the back-scanning S33. The inverse wavelet transform unit 80 executes inverse wavelet transformation to generate a decoded band synthesis image S6.

The band image splitting unit 20, band image encoding unit 30, band image decoding unit 40 and the band image synthesis unit 50 are constructed as described above. The wavelet transform and the inverse wavelet transform, executed by the wavelet transform unit 60 and the inverse wavelet transform unit 80, is explained.

Figure 5:
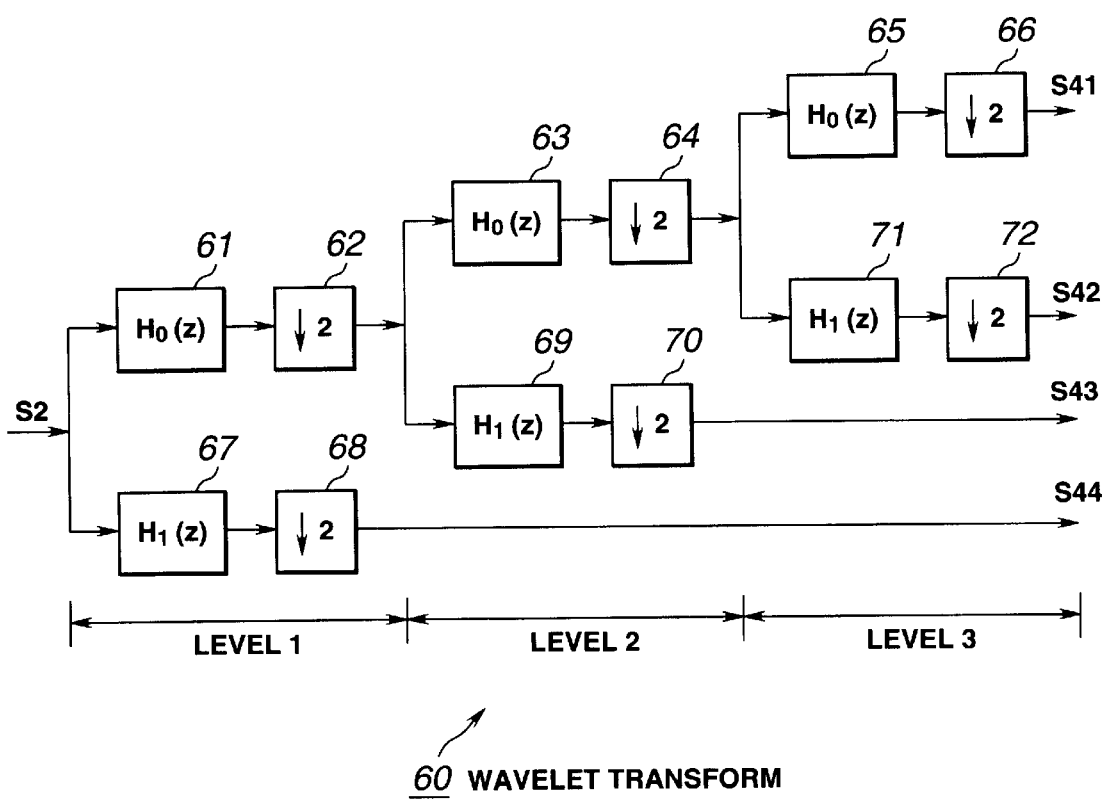
FIG. 5 is a block circuit diagram showing a specified structure of the band image splitting unit.

Referring to FIG. 5, the wavelet transform unit 60 includes low-pass filters 61, 63, 65, downsamplers 62, 64, 66, arranged in respective output stages of the low-pass filters 61, 63, 65 for lowering the resolution of the input image to one-half, high-pass filters 67, 69, 71 and downsamplers 68, 70, 72, arranged in respective output stages of the high-pass filters 67, 69, 71 for lowering the resolution of the input image to one-half.

The wavelet transform 60, constructed as mentioned above, performs the band splitting using level-based wavelet transform.

The input image is first split, as a level 1, into low-frequency components by the low-pass filter 61, while being split into high-frequency components by the high-pass filter 67. The image split into the lower frequency range by the low-pass filter 61 is reduced in resolution to one-half by the downsampler 62, while the image split into the higher frequency range by the high-pass filter 67 is reduced in resolution to one-half by the downsampler 68.

The image data outputted by the downsampler 62 is inputted to the downstream side low-pass filter 63 and high-pass filter 69. From the downsampler 68 is outputted image data S44 comprised of the highest range component.

As the level 2, the low-frequency component, obtained as mentioned above, is further split into the low-frequency and high-frequency components and processed by downsampling. That is, the image of the low-range component is split by the low-pass filter 63 to a still lower range while being split by the high-pass filter 69 to a still higher range. The image split into the still lower range by the low-pass filter 63 is reduced by the downsampler 64 in resolution to one-half, while the image split into the still higher range by the high-pass filter 69 is reduced by the downsampler 70 in resolution to one-half.

The image data outputted by the downsampler 64 is inputted to the downstream side low-pass filter 65 and high-pass filter 71. From the downsampler 70 is outputted image data S43 comprised of the second highest band component.

As the level 3, the image is further split into lower and higher ranges and downsampled. That is, the image is split by the low-pass filter 65 and the high-pass filter 71 into lower and higher components. The image split into the low frequency range by the low-pass filter 65 is reduced in resolution by the downsampler 66 to one-half, while the image split into the high frequency range by the high-pass filter 71 is reduced in resolution by the downsampler 72 to one-half.

The downsampler 66 outputs image data S41 made up of the lowest band component, while the downsampler 72 outputs image data S42 made up of the second lowest band component.

The inverse wavelet transform unit 80 is configured for executing the processing which is the reverse of the processing performed by the wavelet transform unit 60.

Figure 6:
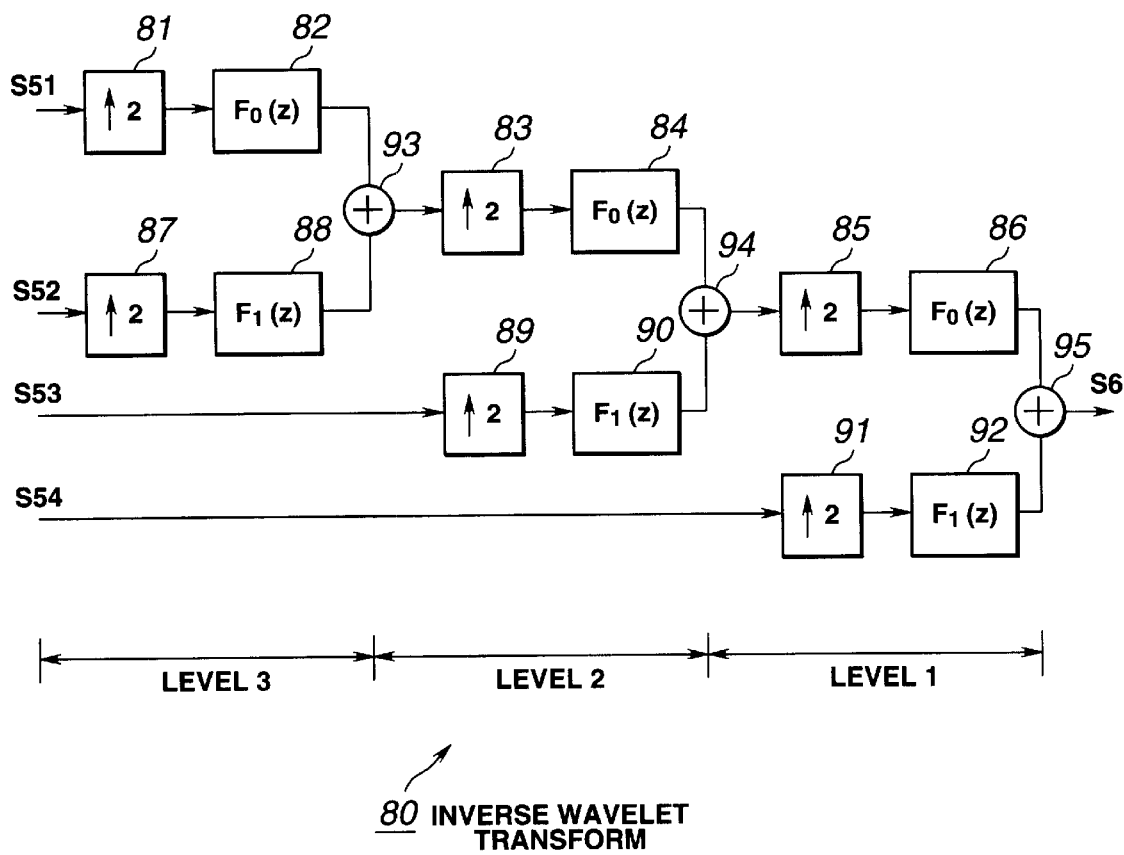
FIG. 6 is a block circuit diagram showing a specified structure of the band image synthesis unit.

Referring to FIG. 6, the inverse wavelet transform unit 80 includes upsamplers 81, 83, 85 for doubling the resolution of the input image, and low-pass filters 82, 84, 86 arranged on the output stage side of the upsamplers 81, 83, 85. The inverse wavelet transform unit 80 also includes upsamplers 87, 89, 91 for doubling the resolution of the input image, and high-pass filters 88, 90, 92 arranged on the output stage side of the upsamplers 87, 89, 91. Finally, the inverse wavelet transform unit 80 includes an adder 93 for synthesizing images of the low-pass filter 82 and the high-pass filter 88, an adder 94 for synthesizing images of the low-pass filter 84 and the high-pass filter 90 and an adder 95 for synthesizing images of the low-pass filter 86 and the high-pass filter 92.

The inverse wavelet transform unit 80, constructed as described above, performs band synthesis by level-based inverse wavelet transform.

That is, as a level 3, the image data S51, made up of the lowest bad component, is doubled in resolution by the upsampler 81, and converted into the low-range component by the low-pass filter 82, while the image data S52, made up of the second lowest band component, is doubled in resolution by the upsampler 87, and converted into high-range component by the high-pass filter 88. The resulting high and low range components are synthesized by the adder 93.

Then, as a level 2, the image data generated at the level 3, is doubled in resolution by the upsampler 83, and converted into low-range component by the low-pass filter 84, while the image data S53, made up of the second highest band component, is doubled in resolution by the upsampler 89, and converted into a high-range component by the high-pass filter 90. The resulting high and low range components are synthesized by the adder 94.

Next, as level 1, the image data generated at the level 2, is doubled in resolution by the upsampler 85, and converted into a low-range component by the low-pass filter 86, while the image data S54, made up of the highest band component, is doubled in resolution by the upsampler 91, and converted into a high-range component by the high-pass filter 92. The resulting high and low range components are synthesized by the adder 95.

The inverse wavelet transform unit 80, constructed as mentioned above, generates the above-mentioned band synthesized image.

The foregoing is the explanation of the structure of the image display device. Next, Referring to FIG. 3, level-based image generation, achieved in the wavelet transform unit 60, is explained.

Figure 7:
FIG. 7 shows a specified example of a band image generated by the image display apparatus.

FIG. 3 shows how seven an image of seven band components has been generated by the two-stage splitting up to the level 2. At level 1, an image is split into four band components, namely LL (both horizontal ad vertical components being low), HL (the horizontal component being low and the vertical component being high), LH (the horizontal component being high and the vertical component being low) and HH (both horizontal ad vertical components being high). Similarly, with band splitting of the level 2, the LL component image is further split into the low and high ranges to produce four band images, namely LLLL, LLHL, LLLH and LLHH. If the band splitting is effected as shown in FIG. 3, the actual image is as shown in FIG. 7. It is seen from FIG. 7 that the major portion of the image is contained in the low-frequency components.

The band image, split to the pre-set level as described above, is inputted from the band image splitting unit 20 to the image memory 5 as the band image S7, as shown in FIG. 1. Specifically, of the image band-split by the band image splitting unit 20, the band image S7 of the resolution or level specified by the control signal from the controller 4 is sent from the band image splitting unit 20 and stored or held in the image memory 5. If, for example, the resolution or level one-fourth that of the original image is designated, as shown in FIG. 3, the image LLLL is stored as the band image S7 in the image memory 5. Alternatively, the band image is displayed on the display unit in a manner shown for example in FIGS. 8 and 9.

Figure 8:
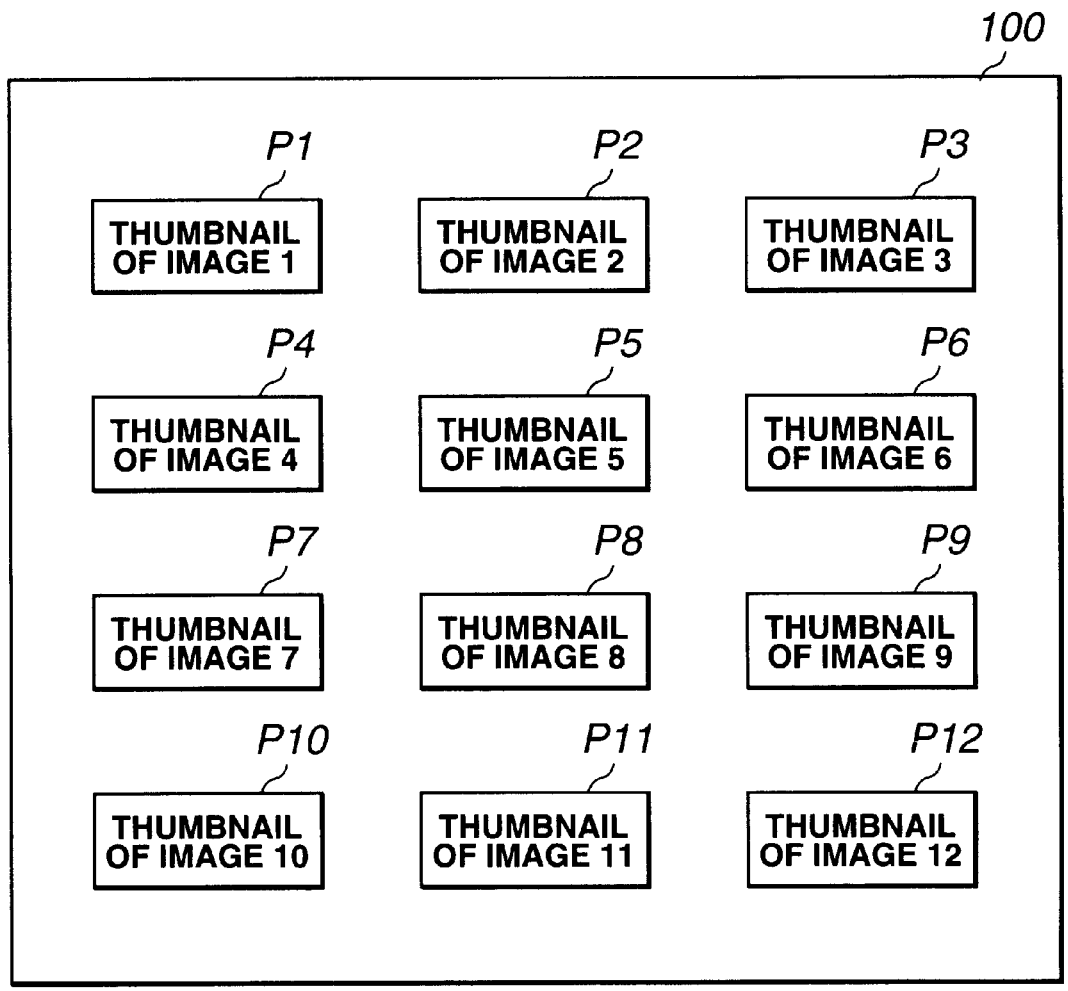
FIG. 8 shows a specified example of a thumbnail image.

The display configuration shown in FIG. 8 is the so-called thumb-nail image appearing often in a display picture in electronic still cameras or video movie. This thumb-nail image is characterized in that plural images as shot, namely images $P_1$ to $P_{12}$, can be viewed at a time. The images $P_1$ to $P_{12}$, as thumb-nail images, are constructed as plural images in association with the plural images inputted by the image inputting unit 1.

Since these thumb-nail images are of such resolution that a viewer can barely comprehend the image contents, it is sufficient if the above-mentioned band-split images split to a larger level is sent as the band image S7.

Figure 9:
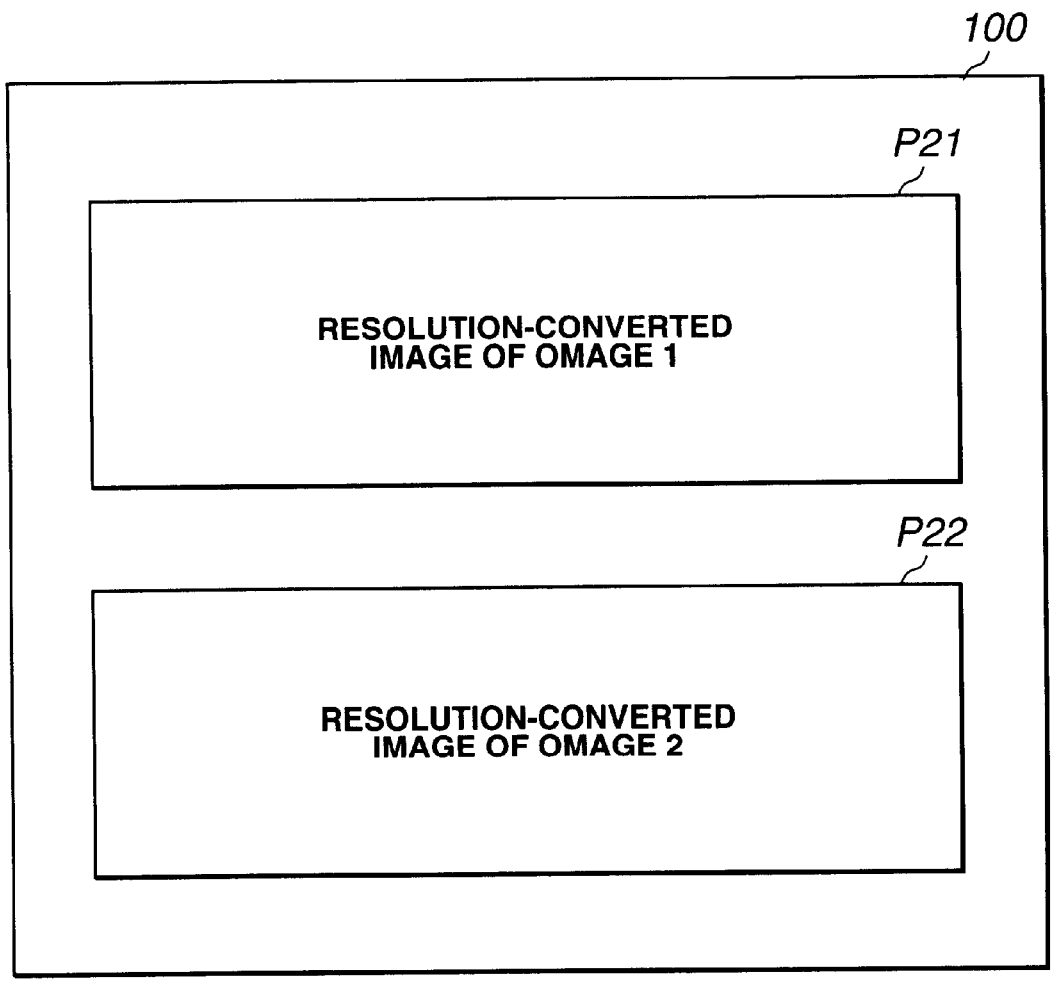
FIG. 9 shows a specified example of a contracted image.

If further details are desired to be viewed, the number of displayed images is reduced to images $P_{21}$, $P_{22}$, to display the band-split images of a smaller number of levels on a display screen 100, as shown in FIG. 9. Therefore, if there is given the information specifying which degree of resolution or which number of levels of the band images are needed, the band image S7 can be outputted by the identical processing.

It is possible with the image display apparatus according to the above-described first embodiment to store and hold the band image of the pre-set level or resolution as an intermediate image in the image memory 5 in the course of splitting the frequency spectrum of an image into band images.

With the image display apparatus, the encoded bitstream obtained on encoding the band image can be decoded and the band image thus decoded can be synthesized to a pre-set level or resolution to an intermediate image which then is stored and held in a similar manner in the image memory 5.

Thus, it is possible with the image display apparatus to display occasionally the band image as the intermediate image stored in the image memory 5 and the decoded band-synthesized image as a thumb-nail image or a contracted image on a viewing screen.

It is noted that the decoded band image may be stored and held in the image memory 5 in a non-synthesized state without being limited to being synthesized and stored in this state in the image memory 5. In such case, the non-synthesized as-decoded band image is displayed on the screen.

Thus, the thumb-nail image or the contracted image frequently used in an imaging apparatus can be produced without requiring special circuitry for generating the thumb-nail image or the contracted image. Since the circuitry for generating the thumb-nail image is not needed, it is possible to reduce the hardware scale correspondingly.

Moreover, since the process of generating the band split images and the encoding process can be unified in the image display apparatus, the processing can be improved in efficiency.

Figure 10:
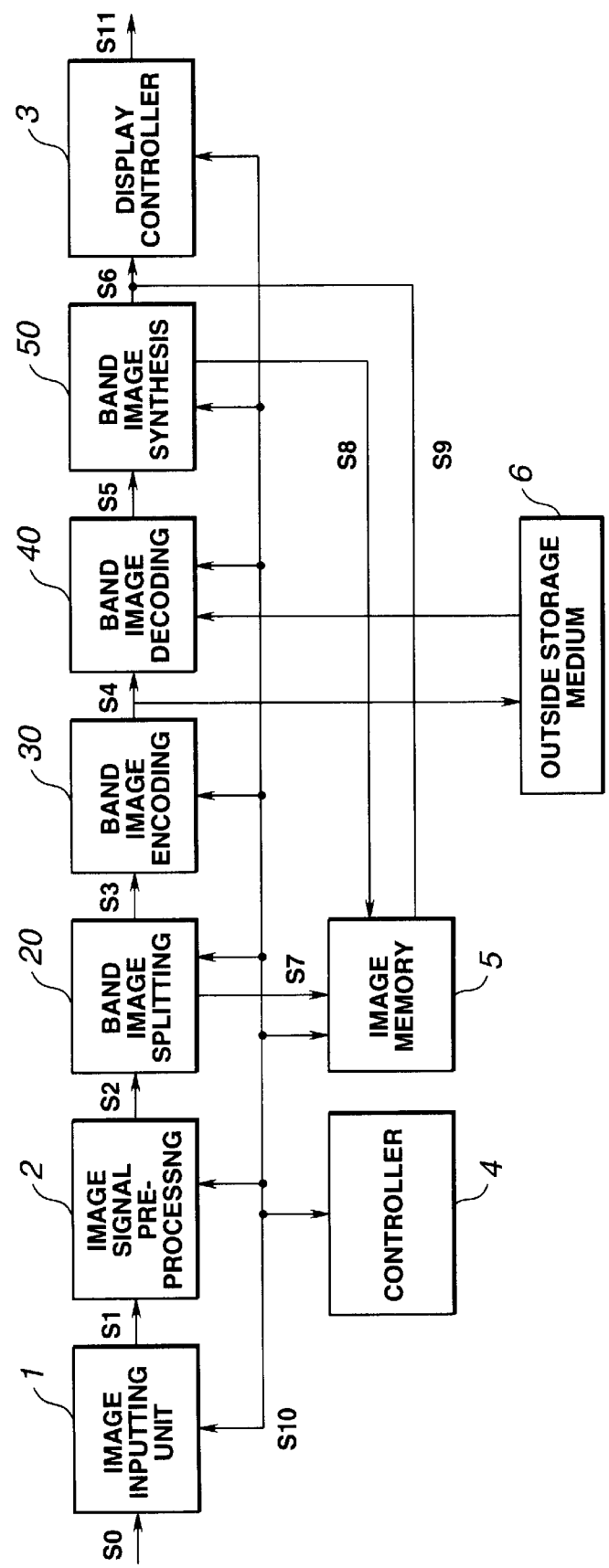
FIG. 10 is a block circuit diagram showing a specified structure of an image display apparatus according to a second embodiment of the present invention.

A second embodiment of the image display apparatus is ha; explained. The image display apparatus of the second embodiment is comprised the image display apparatus of the first embodiment having an external recording medium, specifically an external recording medium 6 as shown in FIG. 10.

The external recording medium 6 is a write/readout recording medium, such as, for example, a memory card, a floppy disc, a so-called mini-disc, a so-called CD-R or a so-called CD-RW.

The operation of the present image display apparatus is hereinafter explained. Similarly to the image display apparatus of the first embodiment, the present image display apparatus decodes the encoded bitstream S4, obtained on encoding by the band image decoding unit 40. The image display apparatus of the present second embodiment differs from the image display apparatus of the first embodiment in that the encoded bitstream S4 is stored and held in the external recording medium 6 as a parallel processing to the decoding processing. The image display apparatus reads out the image from the external recording medium 6, if need be, to decode the read-out image in the band image decoding unit 40. The next following processing is similar to that of the first embodiment described above.

With the above-described structure, it is possible for the image display apparatus to record and store encoding bitrates of a large number of images. The reason is that the information volume of the encoded bitstream S4 is compressed and hence is smaller than the information volume of the original image and that the use of the wavelet encoding leads to further improved compression ratio.

With the present image display apparatus, since the band-split image can be obtained from a decoded image obtained on decoding the encoded bitstream, it is unnecessary to keep the thumb-nail image or the contracted image at all times in the image memory 5 as in the case of the first embodiment of the image display apparatus.

Since the encoded bitstream of the thumb-nail image or the contracted image desired to be viewed can thus be occasionally read out from the external recording medium 6 and decoded to realize the above-mentioned thumb-nail image or the contracted image, the image display apparatus can be improved in ease in handling.

Figure 11:
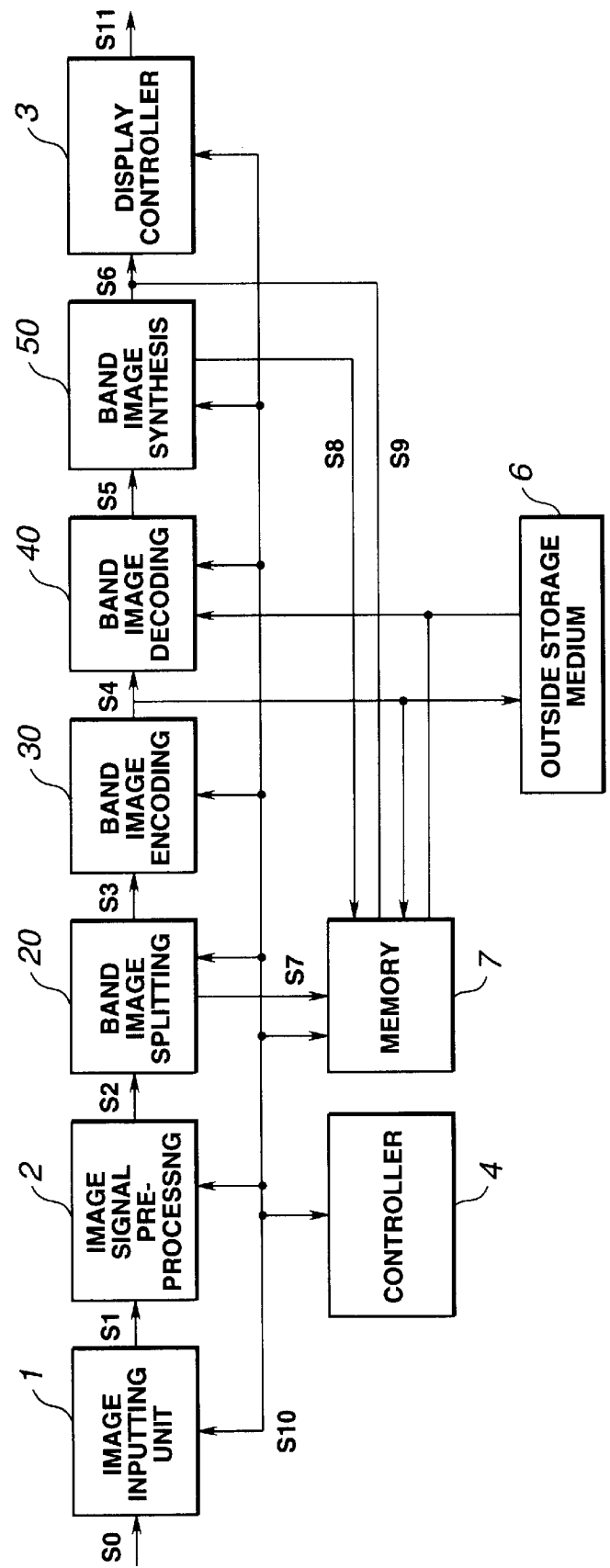
FIG. 11 is a block circuit diagram showing a specified structure of an image display apparatus according to a third embodiment of the present invention.

A third embodiment of the image display apparatus is explained. The third embodiment of the image display apparatus has a memory capable of storing an encoded bitstream, as shown in FIG. 11. This image display apparatus is configured as the image memory 5 owned by the image display apparatus of the second embodiment modified to a memory 7.

With the present image display apparatus, the encoded bitstream S4 stored and held in the external storage medium 6 in the second embodiment of the image display apparatus can simultaneously be stored in the memory 7. Moreover, a pre-set band-synthesized image S8 can be written in the memory 7.

The band image S9, stored and held in the memory 7, can occasionally be read out from the memory 7, responsive to the control signal S10 from the controller 4, and inputted to the display controller 3.

By using the memory 7 for storing and holding the band image and the encoded bitstream, it is possible to raise the use efficiency of the memory 7 as storage means.

Figure 12:
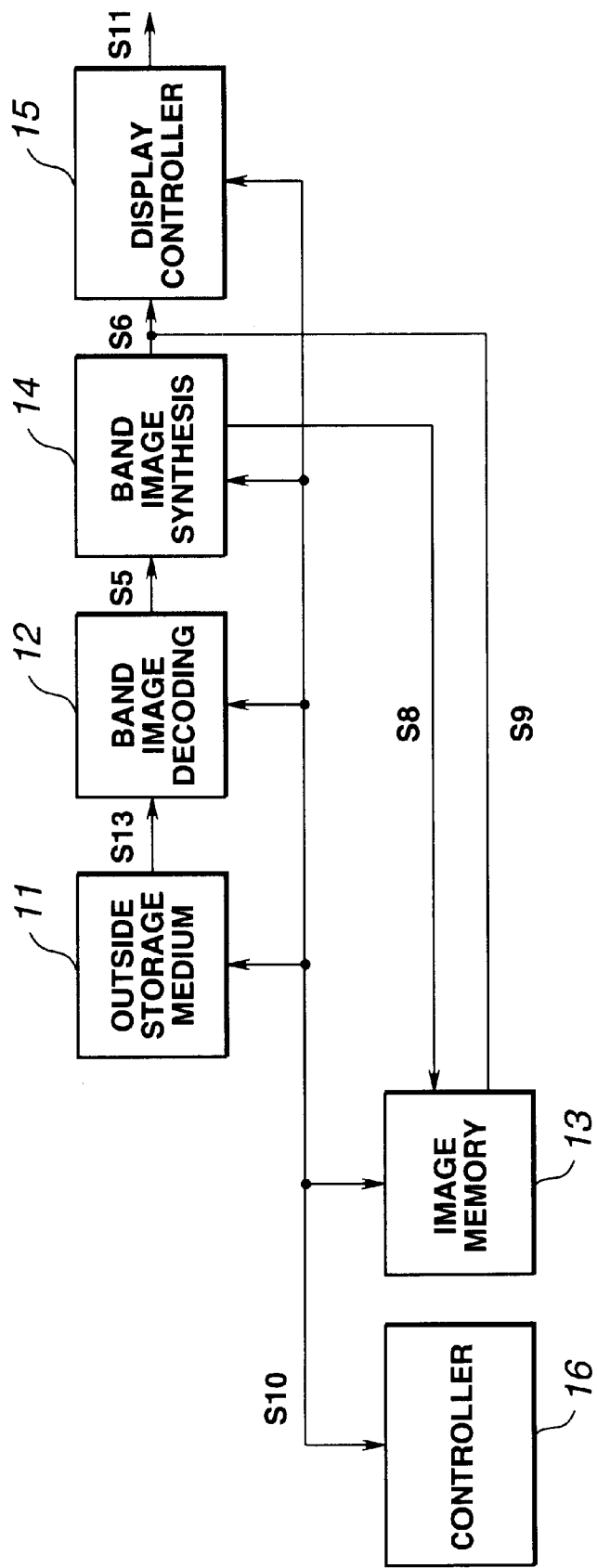
FIG. 12 is a block circuit diagram showing a specified structure of an image display apparatus according to a fourth embodiment of the present invention.

A fourth embodiment of the image display apparatus is hereinafter explained the present fourth embodiment of the image display apparatus includes a band image decoding unit 12, as decoding means for decoding a band image stored in the band-split state in the external recording medium 11 as encoded data, a band image synthesis unit 14 for synthesizing the decoded band image to produce a band synthesis image, an image memory 13 as storage means for storing an intermediate image obtained on the basis of the decoded band image, and a display controller 15, as display controller 15 as display control means for display-controlling the intermediate image, as shown in FIG. 12. The image display apparatus also includes a controller 16 for controlling various components.

The fourth embodiment of the image display apparatus is characterized by an image decoding portion adapted for reading out and decoding an encoded bitstream S13 stored in the external recording medium 11. The functions of the various components are similar to those of the various components of the image display apparatus owned by the image display apparatus of the above-described respective embodiments.

The band image decoding unit 12 decodes the encoded bitstream S13, read out from the external recording medium 11, to generate a band image S5. The band image S5, obtained on decoding, is entered to the band image synthesis unit 14.

The band image synthesis unit 14 generates a band-synthesized image S8, synthesized up to the pre-set level or resolution, by an operation similar to that explained in connection with the first embodiment. The generated band-synthesized image S8 is inputted to the band image synthesis unit 14. The band-synthesized image S8 generated is stored and held in the image memory 13.

The band image, occasionally stored in the image memory 13, is sent to the display controller 15 under control by the control signal S10 from the controller 16.

The display controller 15 displays an intermediate image, such as a band image synthesized up to a pre-set level, on a display unit. The display configuration may, for example, be as shown in FIG. 8 or 9.

The image display apparatus of the fourth embodiment differs from the image display apparatus of the above-described embodiment since it is directed to a decoding portion. The image display apparatus may, for example, be applied to an Internet terminal, a small-sized portable terminal, fitted with a liquid crystal display, required only to have the decoding, unit such as a set top box or a decoding software module, loaded thereon, a mobile receiver, or a mobile telephone terminal.

A fifth embodiment of the image display apparatus is hereinafter explained. The image display apparatus of the present fifth embodiment enables only the encoded bitstream of the targeted band image to be read out and decoded without decoding the totality of the encoded bitstream.

This is based on the consideration that, if the header is attached to each band image to provide a hierarchical structure of the encoded bitstream, it is sufficient if only the encoded bitstream of the targeted band image is read out and decoded at the time of decoding, without reading the totality of the encoded bit, thus improving the efficiency. That is, the encoded data is scalable, such that, by encoding part of the encoded data, there is generated the image band of a pre-set resolution. This configuration is realized by the encoded bitstream shown in FIG. 13.

Figure 13:
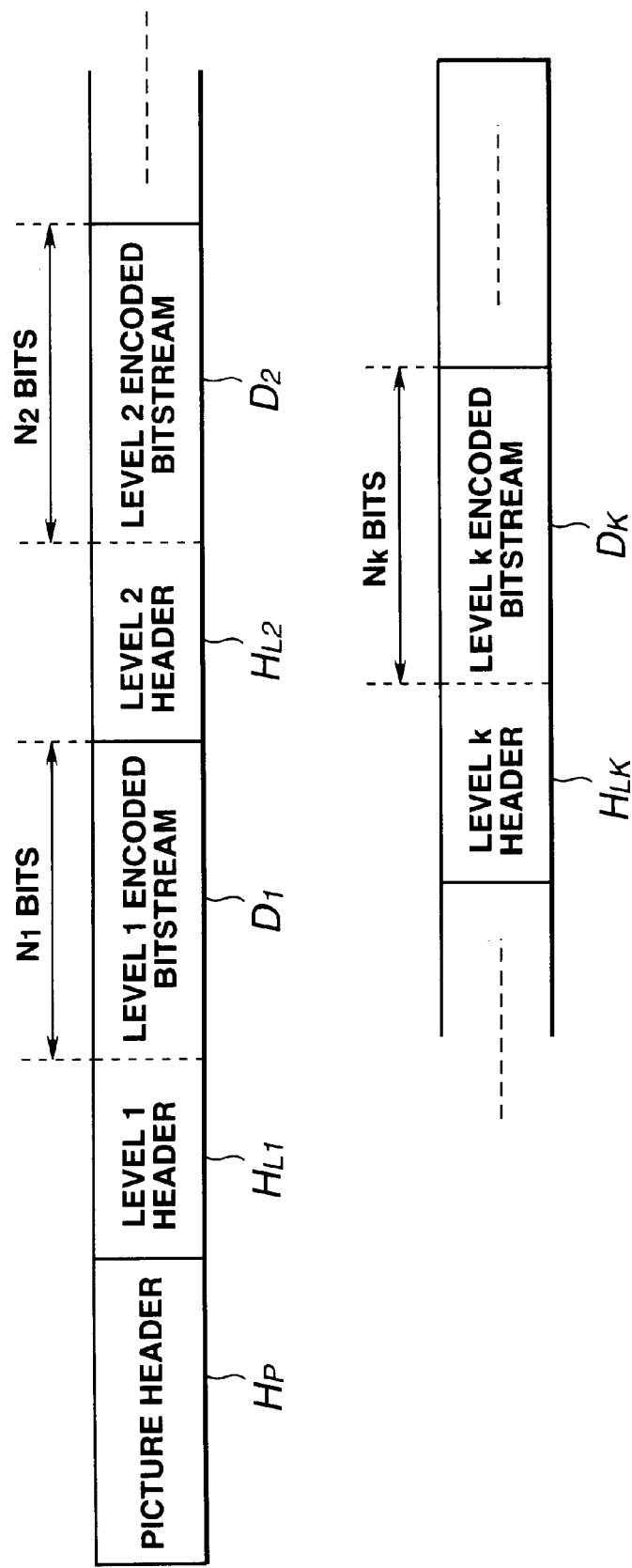
FIG. 13 shows the structure of an encoding bit rate enabling the read-in of a band image by an image display apparatus according to a fifth embodiment of the present invention.

Referring to FIG. 13, the encoded bitstream has, looking from the leading end, a picture header $H_p$, stating the horizontal and vertical sizes of the entire image, an a header $H_{L1}$ of a level 1 of band splitting, an encoded bitstream $D_1$ of the band image of the level 1, a header $H_{L2}$ of the level 2 of band splitting, an encoded bitstream $D_2$ of the band image of the level 2, and so forth up to the header $H_{Lk}$ of the existing level and the encoded bitstream $D_k$ of the existing level.

In the above-described structure of the encoded bitstream, if two neighboring headers of respective levels are read, data present between the read-out levels represents the encoded bitstream of the level, so that only the desired encoded bitstream can be decoded without the necessity of decoding the encoded bitstreams of the remaining levels.

Although the encoded bitstream of the level desired to be decoded is detected in the present embodiment by reading the headers of the respective levels, it is possible to have direct access to the leading end of the encoded bitstream of the level desired to be decoded and to decrease the number of times of reading the encoded bitstream if the bit length of the encoded bitstream of a given level is stated at the header of the level and if also the header length of the level is fixed. This leads to improved throughput of the entire system to realize a fast operation.

Although the image display apparatus is described above as an embodiment of the image generating apparatus according to the present invention, the present invention is not limited to this embodiment. For example, the above-described image display apparatus may be modified from a circuitry designed for expanding and compressing the image by exploiting the band components of the image. That is, the image display apparatus can be annexed to an equipment configured for compressing and expanding a picture.

For example, the present invention may be applied to a companding unit for a high definition image, such as an electronic still camera, a video movie, a portable or mobile image transmission terminal, or a satellite image, a software module therefor, or an image for medical applications, a companding unit of a texture used in a game or a three-dimensional computer graphics.

What is claimed is:

1. An image generating apparatus comprising:

image inputting means for inputting an image;

image processing means for pre-processing the input image for generating a digitized image;

band image splitting means for splitting the frequency spectrum of the digitized image to yield one or more band-based band images and adding a header to each band-based band image to provide a hierarchical structure;

storage means for storing an intermediate image obtained based on said one or more band images; and display control means for displaying the intermediate image in a controlled manner on a display unit, wherein said display control means displays a plurality of intermediate images associated with a plurality of input images input from the image inputting means on the display unit at a same time.

2. The image generating apparatus according to claim 1 wherein said display control means displays one of said band images, obtained on band splitting by said band image splitting means, as said intermediate image on said display unit.

3. The image generating apparatus according to claim 1 further comprising:

encoding means for converting the band images into encoded data; and decoding means for obtaining said band image decoded from said encoded data;

said display control means displaying said decoded one of the band images as said intermediate image on said display unit.

4. The image generating apparatus according to claim 3 wherein said storage means stores a pre-set band image decoded by said decoding means.

5. The image generating apparatus according to claim 4 wherein said intermediate image is a thumb-nail image.

6. The image generating apparatus according to claim 4 wherein said intermediate image is a contracted image.

7. The image generating apparatus according to claim 3 wherein said encoded data is stored in said storage means.

8. The image generating apparatus according to claim 3 wherein said encoded data stored in said storage means is decoded.

9. The image generating apparatus according to claim 3 further comprising:

external storage means for storage of said encoded data.

10. The image generating apparatus according to claim 3 wherein said encoded data stored in said external storage means is decoded by said decoding means.

11. The image generating apparatus according to claim 1 further comprising:

band image synthesizing means for synthesizing said band image to produce a band-synthesized image;

said display control means displaying said band synthesized image, synthesized to an intermediate state, as said intermediate image on said display unit.

12. The image generating apparatus according to claim 11 wherein said band image synthesizing means produces said band-synthesized image by inverse wavelet transform processing.

13. The image generating apparatus according to claim 1 wherein said band image splitting means splits the image data into one or more bands by wavelet transform processing.

14. The image generating apparatus according to claim 1 wherein said image inputting means is constituted by an image pickup element.

15. The image generating apparatus according to claim 1 wherein said image processing means is constituted by a gain controller and an A/D converter.

16. The image generating apparatus according to claim 1 wherein said encoded data is scalable and wherein part of said encoded data is encoded to generate a band image of a pre-set resolution.

17. An image generating method comprising:

an image inputting step for inputting an image;

an image processing step for pre-processing the input image for generating a digitized image;

a band image splitting step for splitting the frequency spectrum of the digitized image into one or more bands to yield one or more band-based band images and adding a header to each band-based band image to provide a hierarchical structure;

a storage step for storing an intermediate image obtained based on said one or more band images; and a display control step for displaying the intermediate image in a controlled manner, wherein the display control step comprises displaying a plurality of intermediate images associated with a plurality of input images at a same time.

18. The image generating method according to claim 17 wherein said display control step displays one of said band images, obtained on band splitting by said band image splitting step, as said intermediate image on said display unit.

19. The image generating method according to claim 17 further comprising:

an encoding step for converting the band images into encoded data; and a decoding step for obtaining said band image decoded from said encoded data;

said display control step displaying said decoded one of the band images as said intermediate image.

20. The image generating method according to claim 17 further comprising:

a band image synthesizing step for synthesizing said band image to produce a band-synthesized image;

said display control step displaying said band synthesized image, synthesized to an intermediate state, as said intermediate image.

21. The image generating apparatus according to claim 20 wherein said band image synthesizing means produces said band-synthesized image by inverse wavelet transform processing.

22. The image generating method according to claim 17 wherein said band image splitting step splits the image data into one or more bands by wavelet transform processing.

23. An image generating apparatus comprising:

reading means for reading a header of one or more band-based band images, the header having a predetermined hierarchical structure value;

decoding means for decoding encoded data comprised of an encoded version of the one or more frequency spectrum band images associated with the read header and obtained on band splitting a digitized input image;

band image synthesizing means for synthesizing the decoded band image to produce a band-synthesized image;

storage means for storing an intermediate image obtained based on the decoded band images; and display control means for displaying said intermediate image in a controlled manner on a display unit, wherein the display control means displays a plurality of intermediate images associated with a plurality of input images on the display unit at a same time.

24. The image generating apparatus according to claim 23 wherein the band image decoded by said decoding means is a band image obtained on wavelet transform; and wherein said band image synthesizing means inverse wavelet transforms the decoded band image to produce a band-synthesized image.

25. The image generating apparatus according to claim 23 wherein said encoded data is scalable and wherein part of said encoded data is encoded to generate a band image of a pre-set resolution.

26. The image generating apparatus according to claim 23 wherein said decoding means decodes said encoded data stored in said external recording means.

27. An image generating method comprising:

a reading step for reading a header of one or more band-based band images, the header having a predetermined hierarchical structure value;

a decoding step for decoding encoded data comprised of an encoded version of the one or more frequency spectrum band images associated with the read header and obtained on band splitting a digitized input image;

a band image synthesizing step for synthesizing the decoded band images to produce a band-synthesizing image;

a storage step for storing an intermediate image obtained based on the decoded band images; and a display control step for displaying said intermediate image in a controlled manner, wherein the display control step comprises displaying a plurality of intermediate images associated with a plurality of input images at a same time.

28. The image generating method according to claim 27 wherein the band image decoded by said decoding step is a band image obtained on wavelet transform; and wherein said band image synthesizing step inverse wavelet transforms the decoded band image to produce a band-synthesized image.

* * * * *